(12) United States Patent
Logan et al.

(10) Patent No.: US 7,540,889 B2
(45) Date of Patent: Jun. 2, 2009

(54) PRODUCTION OF A REFINERY FEEDSTOCK FROM SOAPS PRODUCED DURING A CHEMICAL PULPING PROCESS

(75) Inventors: Mark James Logan, Prince George (CA); Phillip Richard Pearce, Prince George (CA); David George Dick, Prince George (CA)

(73) Assignee: Bluekey Energy Inc., Prince George, BC (CA)

( * ) Notice: Subject to any disclaimer, the term of this patent is extended or adjusted under 35 U.S.C. 154(b) by 258 days.

(21) Appl. No.: 11/456,766

(22) Filed: Jul. 11, 2006

(65) Prior Publication Data

US 2008/0015373 A1    Jan. 17, 2008

(51) Int. Cl.
*C06F 3/02*       (2006.01)
*C10L 1/10*       (2006.01)
*C07C 51/00*      (2006.01)
*C07C 51/43*      (2006.01)

(52) U.S. Cl. ............................. 44/512; 44/306; 554/167; 554/177

(58) Field of Classification Search ............... 44/306, 44/512; 554/167, 177
See application file for complete search history.

(56) References Cited

U.S. PATENT DOCUMENTS

| 4,164,506 | A | | 8/1979 | Kawahara et al. |
| 4,364,743 | A | * | 12/1982 | Erner ........................ 44/388 |
| 5,008,046 | A | | 4/1991 | Bremus et al. |
| 6,399,800 | B1 | | 6/2002 | Haas et al. |
| 6,642,399 | B2 | | 11/2003 | Boocock |
| 2001/0049452 | A1 | | 12/2001 | Reaney |
| 2003/0032826 | A1 | | 2/2003 | Hanna |
| 2004/0254387 | A1 | | 12/2004 | Luxem et al. |
| 2005/0081435 | A1 | | 4/2005 | Lastella |
| 2007/0130820 | A1 | * | 6/2007 | Chatterjee et al. ............. 44/306 |

FOREIGN PATENT DOCUMENTS

| CA | 2104965 | 8/1992 |
| WO | WO 93/23132 | 11/1993 |
| WO | WO 2005/035693 A2 | 4/2005 |

* cited by examiner

*Primary Examiner*—Jafar Parsa
(74) *Attorney, Agent, or Firm*—Oyen Wiggs Green & Mutala LLP

(57) ABSTRACT

The process for preparing a refinery feedstock from black liquor soap comprising adding excess alcohol (preferably methanol) to black liquor soap. Acid is then added to the mixture to drop the pH of the mixture to approximately 2 to convert carboxylate salt of fatty and resin acids to the free fatty and resin acids. In the reaction process, the free fatty and resin acids react with the alcohol, with the aid of the acid catalyst, to yield the desired ester products. The resulting feedstock can be distilled or refined to yield sterols and related alcohols, biodiesel and other fuels.

13 Claims, 2 Drawing Sheets

PRODUCTION OF A REFINERY FEEDSTOCK FROM SOAPS PRODUCED DURING A CHEMICAL PULPING PROCESS

TECHNICAL FIELD

This invention relates to the production of a refinery feedstock from soaps produced in a chemical pulp mill. In particular, the invention relates to the esterification of such soaps to produce a refinery feedstock.

BACKGROUND

In a typical chemical pulp mill, such as a Kraft pulp mill, white liquor containing active cooking chemicals, sodium hydroxide (NaOH) and sodium sulphide ($Na_2S$) is used for cooking wood chips. The residue, called black liquor, is concentrated by evaporation and burned in a recovery boiler furnace to yield an inorganic smelt of sodium carbonate ($Na_2CO_3$) and sodium sulphide. The smelt is then dissolved to form green liquor, which is reacted with calcium hydroxide ($Ca(OH)_2$) to convert sodium carbonate to sodium hydroxide (NaOH) and regenerate the original white liquor.

Methods for soapstock acidulation have been known in the art previously. U.S. patent application No. 2001/0049452 to Reaney discloses the separation and processing of a soapstock obtained from vegetable oil sources. Between 10 and 100% by weight of a monohydric alcohol is added to the soapstock. Reaney discloses that the alcohol is preferably not soluble in water, i.e. isopropanol, n-propanol, isoamyl alcohol, and fusel oil. An acid is added to acidify the soap, preferably at a pH of 4, and the alcohol layer is separated from the acid-water layer. The alcohol layer contains the fatty acids, and esterification of the fatty acids with the alcohol solvent may be carried out by heating the layer while removing the water of reaction, presumably to drive the reaction to completion.

Although there is both an acidulation reaction and an esterification reaction disclosed by Reaney, his process cannot be adapted as a single step in a Chemical mill pulping process. The alcohols disclosed by Reaney are not soluble in water and the aqueous layer is removed before heating the reaction mixture to produce the desired ester.

Acidification of tall oil soap using carbon dioxide is known in the art. PCT application No. WO 93/23132 to Huibers et al. discloses the acidulation of tall oil soap with $H_2SO_4$ to produce crude tall oil. In the process, insoluble $Na_2SO_4$ is produced.

Acid-catalyzed esterification of fatty acids with alcohols is known in the art. U.S. patent application No. 2003/0032826 to Hanna discloses a process for the production of biodiesel through the transesterification of triglycerides from animal or plant sources, with an excess of alcohol. The catalyst used may be alkali, acid, or enzyme. The reactants are injected into the reaction chamber at a temperature of between 80-200° C. Hanna discloses the use of an acid-catalyzed transesterification reaction with a triglyceride starting material, but not a free fatty acid, in order to produce biodiesel.

U.S. patent application No. 2004/0254387 to Luxem et al. discloses a method of making alkyl esters, describing a "single step" method for making biodiesel from a vegetable oil source. Luxem et al. disclose the production of biodiesel directly through the acid catalyzed reaction, without a subsequent alkali-catalyzed transesterification reaction. The reaction is performed with an excess of methanol and a sulfuric acid catalyst at temperatures between 80-200° C., and at a pressure of up to 250 psig. Luxem et al. note in a comparative example conducted at ambient pressure that the free fatty acids were completely converted into fatty acid alkyl esters, but that the glycerides were not transesterified. Luxem et al. disclose the production of biodiesel through an acid-catalyzed esterification of the starting product that includes triglycerides.

U.S. Pat. No. 4,164,506 to Kawahara et al. discloses a process for producing lower alcohol esters of fatty acids. Kawahara et al. disclose the use of the acid-catalyzed esterification of fatty acids from vegetable or animal oil sources with methanol, ethanol, or isopropanol. Methanol may be added to the fat in excess of its solubility (i.e. >12-15% by weight). The reaction is carried out between 60-120° C., but preferably at 65-70° C. to restrain inter-esterification of the fat component. The exemplary time period for the reaction is 3 hours. This reaction is followed by alkaline-catalyzed interesterification of the ester product. Kawahara et al. disclose a two step process, including a base-catalyzed transesterification step.

PCT application No. WO 2005/035693 to Zappi et al. discloses production of biodiesel and other valuable chemicals from waste water treatment plant sludge. Sulfuric acid-catalyzed transesterification of triglycerides and esterification of free fatty acids with alcohol is shown. The reaction is carried out at 80° C. at a pressure of 5 atm.

U.S. Pat. No. 5,008,046 to Bremus et al. discloses a process for the continuous esterification of fatty acids. The process reduces the dehydration of alkanols, especially where branched monoalkanols are used. The reaction involves the esterification of C2-C26 fatty acids with C1-C5 monoalkanols or C2-C3 dialkanols in the presence of an acid catalyst. The reaction is carried out under pressure on a reaction column at 200-900 hPa, preferably 700-900 hPa. The reactants are heated to less that 190° C., preferably 120-145° C. Bremus et al. do not disclose an acidulation step to prepare the free fatty acid.

U.S. Pat. No. 6,642,399 to Boocock discloses an acid catalyzed esterification of free fatty acids from natural sources of triglycerides with ethanol or methanol, followed by base-catalyzed transesterification of triglycerides in the mixture. The reaction is carried out at atmospheric pressure and at a temperature of 60-65° C., which is close to the boiling point of methanol. Boocock further discloses the use of a co-solvent to form a single phase solution of alcohol, fatty acids, and fatty acid triglycerides; preferably an ether. The reaction proceeds for 30-60 minutes before it is neutralized, and then the second step of base-catalyzed transesterification of the triglycerides is performed. Boocock suggests that the use of a cosolvent is a necessary component of the process and does not include an acidulation step to produce the free fatty acid, and discloses a subsequent base-catalyzed transesterification reaction.

US patent application No. 2005/0081435 to Lastella discloses an acid catalyzed transesterification of plant or animal fats with methanol to produce biodiesel. Waste oil at 50-150° F. is mixed with a catalyst and alcohol, such as sulfuric acid and methanol. The oil flows to a second reaction chamber, where a base-catalyzed transesterification reaction occurs.

U.S. Pat. No. 6,399,800 to Haas et al. discloses the preparation of soapstock, followed by the acid-catalyzed esterification of oils from plant or animal sources. Reaction conditions for the acid-catalyzed esterification are performed at 25-200° C., with a preferred temperature of 35° C. to reduce energy requirements. Pressure up to about 20 atm may be used, but atmospheric pressure is preferred. Reaction time may be as short as a half hour.

The foregoing examples of the related art and limitations related thereto are intended to be illustrative and not exclusive. Other limitations of the related art will become apparent to those of skill in the art upon a reading of the specification and a study of the drawings.

SUMMARY OF THE INVENTION

The following embodiments and aspects thereof are described and illustrated in conjunction with systems, tools and methods, which are meant to be exemplary and illustrative, not limiting in scope. In various embodiments, one or more of the above-described problems have been reduced or eliminated, while other embodiments are directed to other improvements.

The invention is directed to a method for producing a refinery feedstock from black liquor soap comprising first mixing the black liquor soap with an alcohol and secondly mixing the resulting product with a strong acid to produce the refinery feedstock.

The black liquor soap can be obtained from a chemical pulp mill. The alcohol can be selected from the group consisting of methanol, ethanol or isopropanol. The acid can be selected from the group consisting of sulfuric acid, hydrochloric acid or formic acid.

The invention is also directed to a method of producing a refinery feedstock from black liquor soap comprising: (a) mixing black liquor soap with an alcohol; (b) adding an acid to the mixture of step (a) to produce the sodium salt and cause catalytic esterification of the fatty and resin acids; (c) separating solids from the product of step (b); and (d) refining the product of step (c). The solids mentioned in (c) above can be separated by mechanical means such as filtration or settling. Refining or distilling the product of step (c) will yield methanol, sterols and related alcohols, gasoline and other fuels and biodiesel.

The invention also pertains to a refinery feedstock produced by any of the processes of the invention.

DRAWINGS

Exemplary embodiments are illustrated in referenced figures of the drawings. It is intended that the embodiments and figures disclosed herein are to be considered illustrative rather than restrictive.

DETAILED DESCRIPTION OF THE INVENTION

Figure 1:
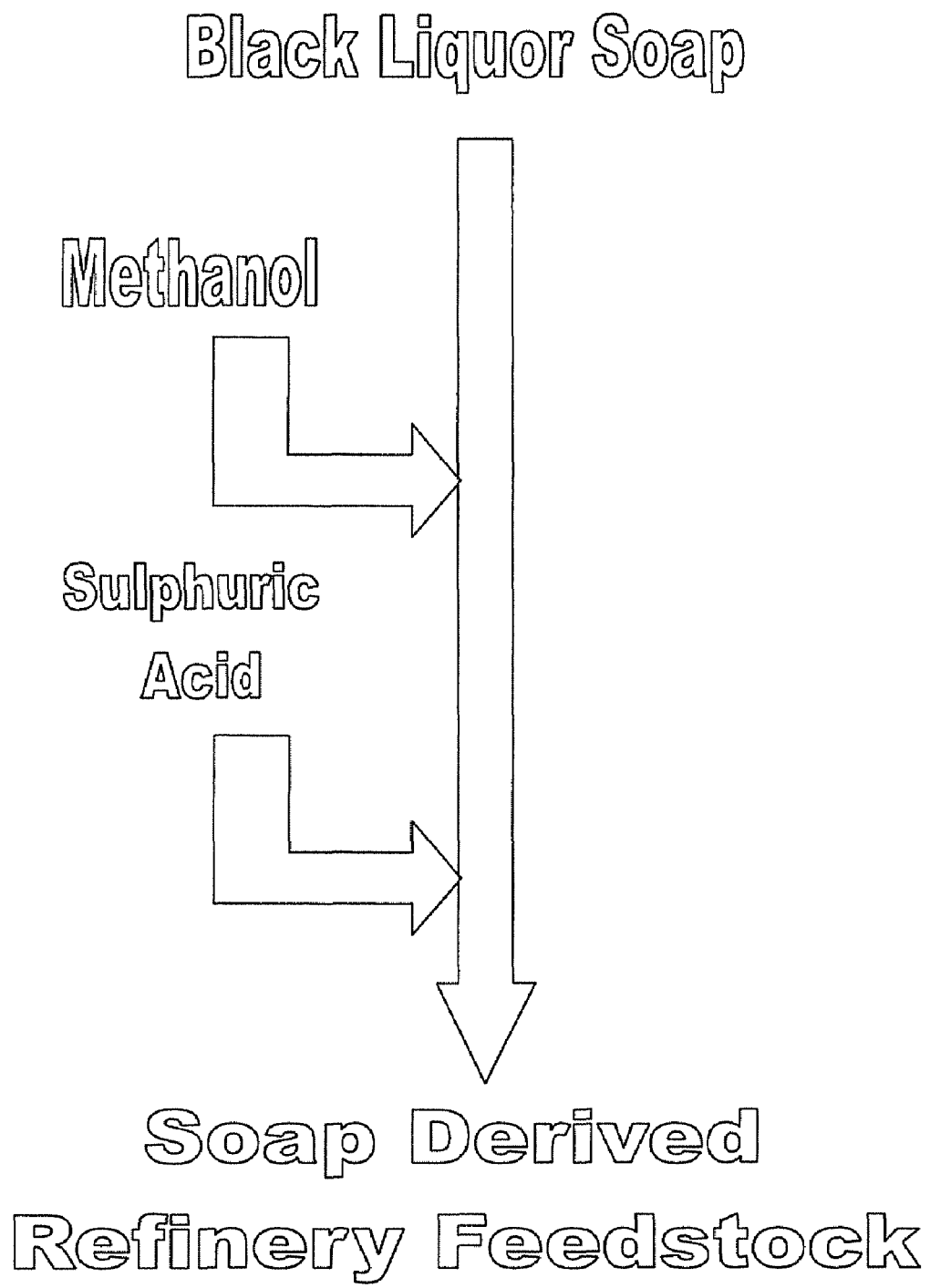
FIG. 1 illustrates a flowsheet of the basic process according to the invention, involving sequentially adding methanol and suphuric acid to black liquor soap to product a soap derived refinery feedstock.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Refinery feedstock may be produced from the soap skimmed from pulping liquor in a chemical pulp mill. The resinous material in pines and other species is made up of fatty and resin acids, as well as sterols and related alcohols. During chemical pulp mill cooking of the pulp, the fatty and resin acids become saponified into sodium soaps. Black liquor soap is the sodium salts of resin and fatty acids produced during the chemical pulping process. The inventor has created a process for removing the sodium ion from the black liquor soap and esterifying the resin and fatty acids in a single vessel, creating a feedstock for further refining.

The process mixes black liquor soap with methanol, ethanol or isopropanol followed by acidification with sulphuric acid or other strong acid. The acid is used to remove the sodium ion from the soap, and catalytic esterification of the fatty acid and resin acids takes place with the alcohol. The sterols and related alcohols present in the soap also react to produce esters with the fatty and resin acids. The resulting esters are not desirable end products in the production of a refinery feed stock; as a result, the alcohol may be added in excess to improve the yield of product. Adding an excess of the alcohol may require distillation to reclaim the excess alcohol to make the process economically viable. The resultant mixture may then be further treated and refined to produce other products through distillation, filtering or other refinements.

During the chemical pulping process the black liquor solids are concentrated by evaporation until they support combustion. They are then burned in a recovery boiler that supplies steam for process and electricity production. Due to the hydrophobic nature of the fatty and resin acid compounds in the black liquor, they separate as fatty and resin acid soaps as the percent solids in the black liquor increases. If the soaps are not removed, they can foul evaporation equipment surfaces, thereby resulting in higher mill energy usage for evaporation and in extreme cases, production losses. A small number of pulp mills endeavour to avoid the problem by keeping the soap in solution with thorough mixing. However, if the recovery boiler is the production bottleneck, this results in lower pulp production rates.

Standard practice in most chemical pulp processes is to:
(a) Remove the soap in the black liquor and convert it to tall oil or
(b) keep the black liquor well mixed and burn the soap in the recovery boiler.

Soap removal and conversion to tall oil is the preferred option when a chemical pulp mill wishes to increase production rate and recovery boiler capacity is a limitation.

Once the soap is removed, it is normally conveyed to a chemical plant and processed into crude tall oil by acidification. The following reaction is typical:

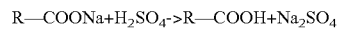

(wherein R=C2-C26)

The inventors herein have invented a one-step process of esterification of the soap compounds in black liquor with an alcohol and acid catalysis, thereby creating a useful refinery feedstock directly from black liquor soap.

Carboxylic acids react readily with alcohols in the presence of a catalytic amount of acids to yield esters. The process is called esterification and is illustrated as follows:

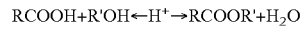

(wherein R=C2-C26)

The presence of methanol during the acidification of the soaps is particularly advantageous because it competes with the sterols in the soap for esterification sites on the fatty and resin acids. For comparison, during the production of tall oil, the esterification of the fatty and resin acids with the sterols forms large organic molecules not suitable for inclusion in tall oil and typically returned to the pulp mill liquor system with the residual spent acid. Methanol competes with this reaction limiting the formation of the large organic molecules. As a result, the amount of organics available for further refining is improved and the amount of organics returned to the mill is minimized. Mills limited by the recovery boiler will be able to achieve further production increases with the process according to the invention. Also, the soap derived refinery feedstock has a much higher yield of fatty acid esters (biodiesel) than conversion of soap to tall oil followed by production of biodiesel. Moreover, because the sterols are not consumed, further distillation can return significantly more sterols than attempting to obtain sterols from tall oil.

In this description, chemical pulp mill means a wood-pulping mill, which uses an alkaline sulfide solution containing sodium hydroxide and sodium sulfide (white liquor) in the wood digesting process.

Specifically, the inventors have developed a novel process for producing a refinery feedstock from the soap skimmed from black liquor in a chemical pulp mill. The resinous material in pines (pinus contorta) and alpine fir (abies lasiocarpa) white spruce (picea glauca) and other species of trees is made up of fatty and resin acids as well as sterols and related alcohols.

During chemical cooking of the pulp made from such species, the fatty and resin acids become saponified or converted into sodium soaps. Black liquor soap produced during chemical pulping thus contains sterols and related alcohols and the sodium salts of resin and fatty acids. The soaps separate from the aqueous phase during handling of the black liquor.

Chemistry of Refinery Feedstock Production from Black Liquor Soap

Traditional routes to biodiesel production involve base-catalyzed trans-esterification of triglycerides found in fats or vegetable oils. Glycerol is a by-product of this reaction.

In the subject process, the free fatty acids (as carboxylate salts) present in the black liquor are converted to a refinery feedstock by acid-catalyzed esterification with an alcohol. The first step is the facile conversion of the carboxylate salt of the fatty acid to the free fatty acid by the addition of an acid at approximately pH=2. In this example, sulfuric acid is used and proceeds according to the reaction:

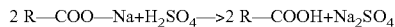
2 R—COO—Na+H₂SO₄—>2 R—COOH+Na₂SO₄

(wherein R=C2-C26)

When this reaction is performed in the presence of methanol, the esterification reaction proceeds to form the refinery feedstock of the invention according to the reaction:

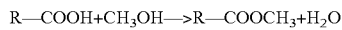
R—COOH+CH₃OH—>R—COOCH₃+H₂O (wherein R=C2-C26)

The overall single vessel process can be written as:

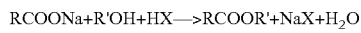
RCOONa+R'OH+HX—>RCOOR'+NaX+H₂O (wherein R=C2-C26 and X is a cation)

Figure 2:
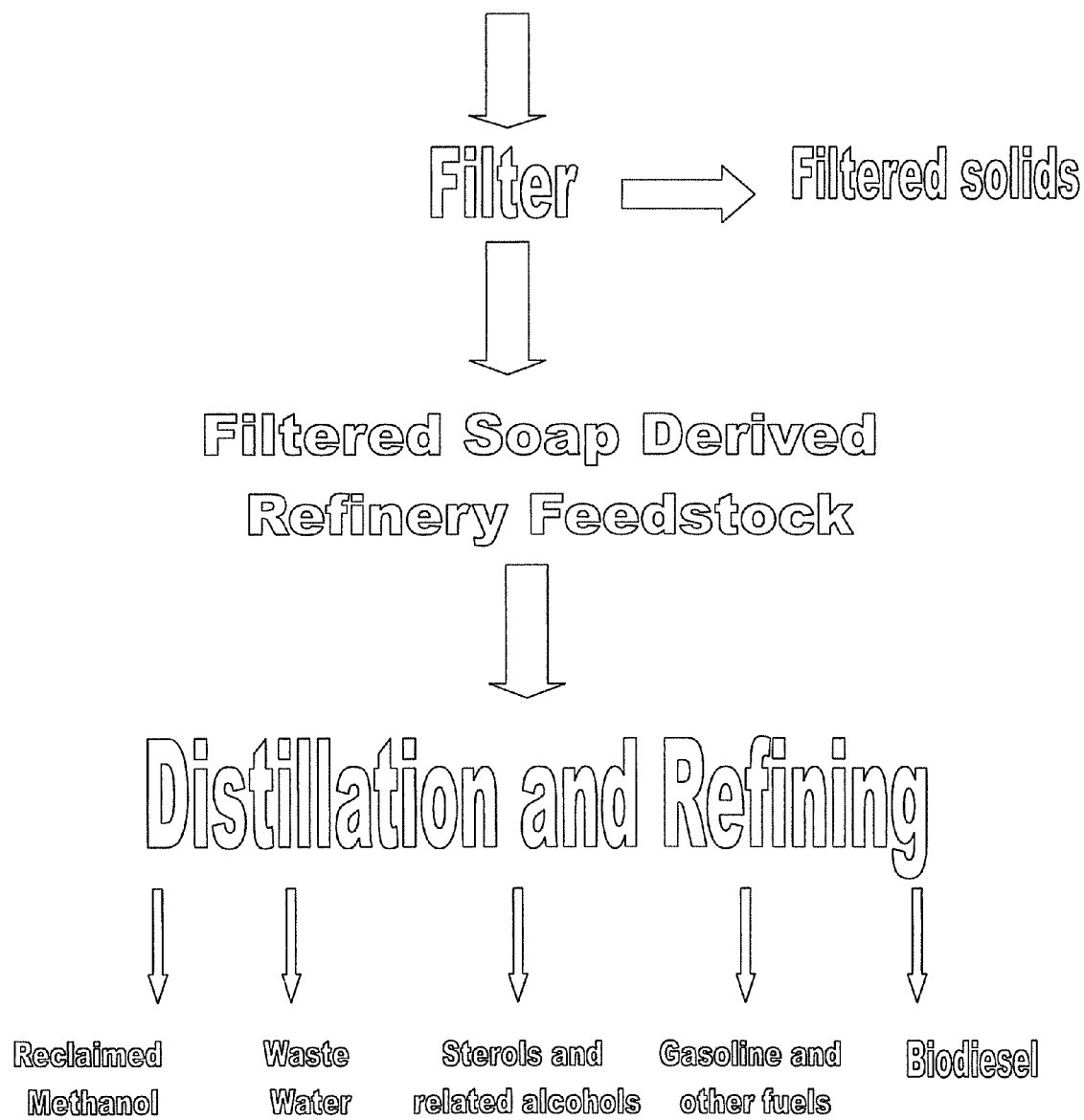
FIG. 2 illustrates a flowsheet of the soap derived refinery feedstock produced as shown in FIG. 1 followed by downstream solids separation and product distillation and refining.

Exemplary embodiments are illustrated in referenced figures of the drawings. It is intended that the embodiments and figures disclosed herein are to be considered illustrative rather than restrictive. FIG. 1 illustrates a flowsheet of the basic process according to the invention, involving sequentially adding methanol and suphuric acid to black liquor soap to product a soap derived refinery feedstock. FIG. 2 illustrates a flowsheet of the soap derived refinery feedstock produced as shown in FIG. 1 followed by downstream solids separation and product distillation and refining. Distillation and/or refining will yield reclaimed methanol, waste water, sterols and related alcohols, gasoline and other fuels and biodiesel.

Refinery feedstock production from this process will be more stable and consistent than traditional plant based refinery feedstock, which is dependent on growing seasons. This process also makes use of existing pulp mill facilities and, therefore, is considerably less capital intensive than known greenfield biodiesel plants requiring the installation of steam generating and acid facilities.

The choice of acid is one of convenience, not necessity. Sulfuric acid is commonly used in chemical pulp processing and this is readily available. Methanol may not necessarily be the only alcohol that can be used to yield the refinery feedstock; ethanol and isopropanol will also yield a usable refinery feedstock.

The advantages of the process according to the invention are:

1. Production of a refinery feedstock from pulp mill byproduct thereby providing a refinery feedstock with ready, year round supply.
2. Reducing the yield lost to esterification of resin and fatty acids with the sterols and related alcohols, by the conventional tall oil process.
3. Reduction of greenhouse gas emissions when the resulting feedstock is further refined and used as a fuel in place of fossil fuels.
4. Black liquor soap is mixed with methanol thereby making it easier to pump and mix.
5. The yield of refinery feedstock is improved, with respect to the production of tall oil, because the side reaction of the fatty and resin acids with sterols and related alcohols in the black liquor soap is greatly reduced by adding methanol in excess. Yield of sterols is improved as well.
6. The cost to produce the refinery feedstock by the process starts with a very low cost raw material (black liquor soap). Black liquor soap typically has no value to a mill. It is a waste product and represents a disposal problem. Other processes, which create biodiesel from tall oil, have a much higher cost because of the value already added to the tall oil due to its previous processing.

While a number of exemplary aspects and embodiments have been discussed above, those skilled in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for producing a refinery feedstock from black liquor soap obtained from a chemical pulp mill comprising:
   (a) separating black liquor soap from pulping liquor produced in a chemical pulp mill and placing the black liquor soap in a vessel;
   (b) mixing the black liquor soap in the vessel with a quantity of alcohol sufficient to esterify resin and fatty acids in the black liquor soap; and
   (c) mixing the product resulting from step (b) in the vessel with a quantity of acid sufficient to remove sodium ion from the black liquor soap to produce the refinery feedstock.

2. A method as claimed in claim 1 wherein the alcohol is selected from the group consisting of methanol, ethanol and isopropanol.

3. A method as claimed in claim 1 wherein the acid is selected from the group consisting of sulfuric acid, formic acid and hydrochloric acid.

4. A method for producing a refinery feedstock from black liquor soap obtained from a chemical pulp mill comprising separating black liquor soap comprising sterols and alcohols and sodium salts of resin and fatty acids, from pulping liquor produced in a chemical pulp mill, mixing in a vessel the black liquor soap with sufficient alcohol selected from the group consisting of methanol, ethanol and isopropanol to esterify resin and fatty acids in the black liquor soap, and then adding to the resulting product in the vessel an acid selected from the group consisting of sulfuric acid, hydrochloric acid and formic acid to reduce the pH of the mixture to about 2, thereby converting carboxylic salt of fatty acid to a free fatty acid and catalytically esterifying the free fatty acid, to produce the refinery feedstock.

5. A method of producing a refinery feedstock from black liquor soap obtained from a chemical pulp mill comprising:
   (a) separating black liquor soap comprising sterols, alcohols and sodium salts of resin and fatty acids from pulping liquor produced in a chemical pulp mill;
   (b) mixing in a vessel the black liquor soap with a sufficient amount of alcohol to esterify resin and fatty acids in the black liquor soap;
   (c) adding to the vessel a sufficient amount of acid to the mixture of step (b) to remove sodium ion from the black liquor soap and produce solids and liquids;
   (d) separating solids from the liquids of product of step (c); and
   (e) refining the solids of step (d) to product a refinery feedstock.

6. A method as claimed in claim 5 wherein the solids from the product of step (c) are filtered and the liquids of step (d) are distilled to reclaim alcohol or obtain biodiesel or sterols and related alcohols.

7. A method as claimed in claim 1 wherein an excess of alcohol is added in step (b) to improve yield of refinery feedstock.

8. A method as claimed in claim 7 wherein excess alcohol not consumed in step (b) is distilled to reclaim the excess alcohol.

9. A method as claimed in claim 1 wherein the refinery feedstock obtained in step (c) is further treated by filtration and distillation to produce a refined feedstock.

10. A method as claimed in claim 2 wherein the alcohol is methanol.

11. A method as claimed in claim 3 wherein the acid is sulfuric acid.

12. A method as claimed in claim 1 wherein the pulp for the chemical pulp mill is obtained from conifers selected from the group consisting of *pinus contorta, abies lasiocarpa* and *picea glauca*.

13. A method as claimed in claim 1 wherein the alcohol in step (b) is methanol, the acid in step (c) is sulfuric acid and the pH of the mixture in the vessel is about 2.

* * * * *